Albert E. Dubord
INVENTOR

BY Hall, Pollock + Vande Sande

ATTORNEY

Albert E Dubord
INVENTOR

BY
Hall, Pollock + Vande Sande
ATTORNEY

Albert E. Dubord
INVENTOR

BY
Hall, Pollock & Vande Sande
ATTORNEY

United States Patent Office 3,529,101
Patented Sept. 15, 1970

3,529,101

INSTRUMENT USING INTERMEDIATE STORAGE FOR REPRODUCING PRE-RECORDED INFORMATION

Albert E. Du Bord, 4980 W. Broadway, Montreal 29, Quebec, Canada

Filed May 20, 1968, Ser. No. 730,559
Claims priority, application Canada, Jan. 9, 1968, 9,438
Int. Cl. G11b *5/86, 15/42, 23/02*
U.S. Cl. 179—100.2 5 Claims

ABSTRACT OF THE DISCLOSURE

An instrument is provided for retrieving information from a medium having a pre-recorded information pattern. The instrument comprises intermediate storage means adapted to be driven by contact thereof with said medium. A pickup head located adjacent the medium is connected to pass information signals from the pre-recorded medium to a recording head located adjacent the intermediate storage means to record information on the intermediate storage means at the rate that the pickup head scans the pre-recorded medium. Information is then retrieved from the intermediate storage means by driving said storage means at the same speed used when the pre-recorded pattern was initially recorded on said medium.

This invention relates to a pick-up and playback system.

When reproducing pre-recorded information, it is necessary to move the medium on which the pre-recording is made at a constant speed relative to a pick-up device, this speed being dependent upon the speed at which the pre-recording was made on the medium. As an example a long playing record is recorded at 33⅓ r.p.m., and in order to play back the information from the record it must be rotated at 33⅓ r.p.m. so that the pre-recorded information can be picked-up in an intelligible form. Similiarly the information put on to a tape recording can only be understood if it is reproduced by being moved over a pick-up head at the same speed at which it was recorded.

This invention relates to a method and apparatus for reproducing information from a pre-recording wherein the pre-recorded medium does not have to be moved at a steady requisite speed relative to the pick-up.

This is accomplished by re-recording the pre-recording on an intermediate storage and then playing back the re-recording from the intermediate storage at a standard speed.

This invention is most easily understood and described with reference to a preferred embodiment in which the pre-recording is on magnetic tape which is cut into strips which are placed in parallel relationship on a page. The pages can be formed into a book. Information such as the correct pronunciation of words in a foreign language can be recorded onto the tape, with the words in the mother tongue written between the strips of pre-recorded material. Such a system of strips of recorded medium on a book page is generally taught in Canadian Pat. 481,600. However, in order to collect the information from the strips in this Canadian patent, it is necessary to move an instrument at a constant steady speed over the strips of recorded medium.

In this invention in order to collect the recorded information from the tape, an instrument is used which consists of an endless tape, a pick-up head for collecting the information from the pre-recorded tape and a recording head for re-recording this information onto the endless tape. This endless tape is positioned so that it is driven directly or indirectly from the pre-recorded tape or from the book page face beside the strip, and hence is moved a distance relative to the length of the strip. To play back the information from the endless tape, it is merely necessary to drive the endless tape at a constant predetermined speed by a motor in the instrument or by an external source. This predetermined speed will be related to the speed at which the strip of recorded medium was originally recorded.

By using such an instrument, it is immaterial at what speed the instrument is passed over the pre-recorded strip in the book.

As previously briefly mentioned with regard to Canadian Pat. 481,600, the prior art type of instruments are made to play back directly when moved over the strip of pre-recorded material, and therefore the play back is directly dependent upon the speed at which the instrument is moved over the pre-recorded strip. It is obviously extremely difficult, if not impossible, to obtain any intelligible sound from the prior art type of instruments. However, this invention, by using an intermediate storage tape achieves an accurate sound play back.

This instrument, although described chiefly with reference to teaching languages, could quite easily be used with other information, and it is belived it would be very obvious to merely later the information carried on the pre-recorded tapes to suit the purpose for which the instrument is to be used. A few of the further uses could be for instance in dictionaries, reference books, etc.

This invention is also being described mainly with reference to magnetic tape recording and reproduction, however the same basic principles apply with other recorded medium such as a photo-electric type in which visual as well as sound reproduction could be obtained.

This invention will now be described with reference to the attached drawings in which.

Figures 1, 2, 2A, 3, 4:
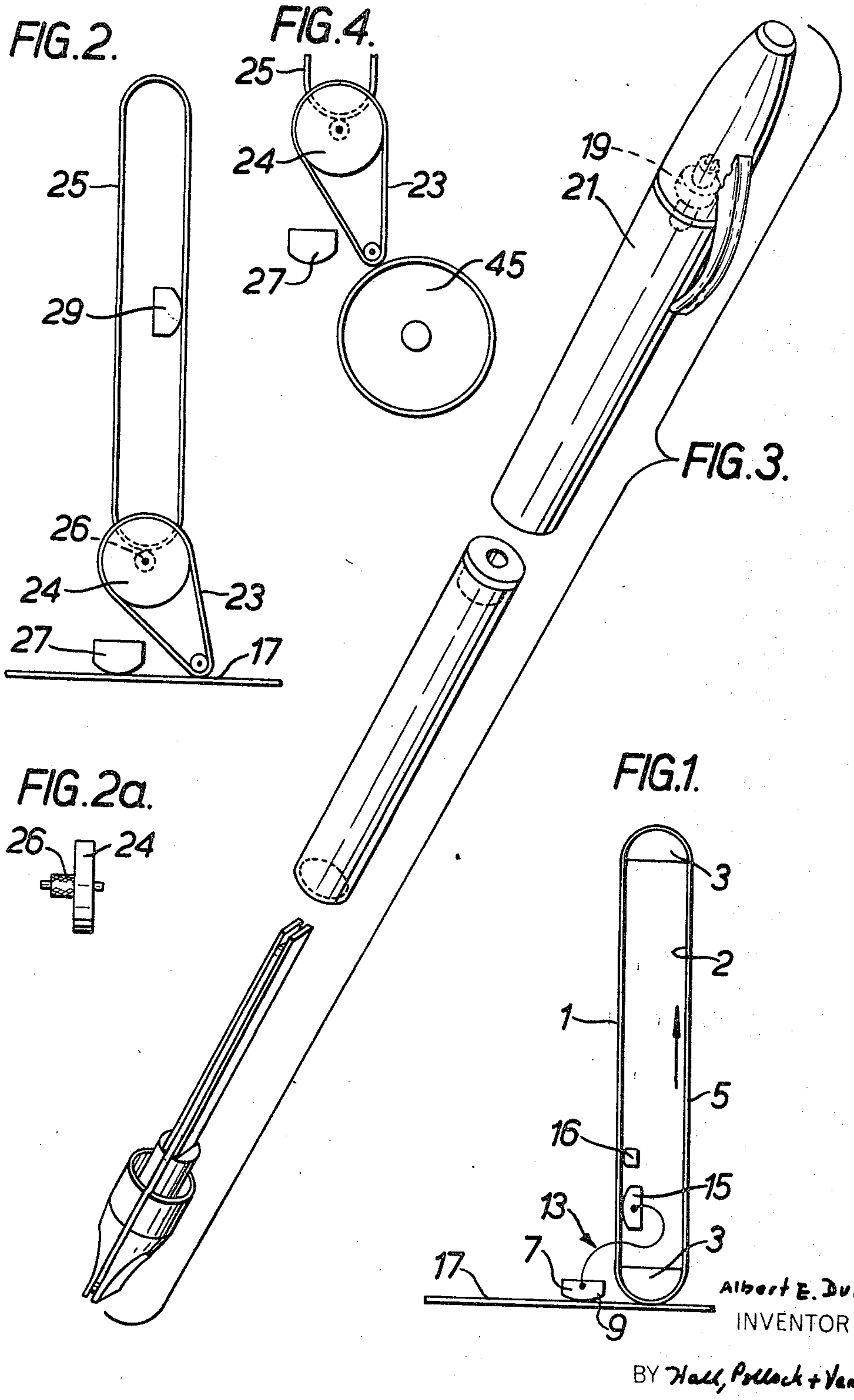
FIG. 1 is a schematic diagram of one embodiment of the instrument of this invention.
FIG. 2 is a schematic diagram of a second embodiment of this invention.
FIG. 2A is a side view of the auxiliary drive pulley of FIG. 2.
FIG. 3 is an exploded view of the instrument of the embodiment of FIG. 1.
FIG. 4 is a schematic diagram of the play back drive being used with the instrument of FIG. 2.

The instrument of FIG. 1 is comprised of an endless magnetic tape 1 which is mounted on nylon or similar runners 3 such that it can freely rotate. The endless tape 1 is fitted with an inner magnetic pick-up covering 2 and an outer covering of driving material 5. This outer covering 5 may be a friction material such as rubber or the like. A magnetic pick-up head 7 is positioned on supports (not shown), so that its pick-up surface 9 is on the same plane as the lower looped end of the magnetic tape outer covering 5. This magnetic pick-up head 77 is electrically connected by wiring and an amplification system 13 to a recording and play back head 15 which is in recording contact with the inner magnetic covering 2 of the endless magnetic tape 1. An erasing head or magnetic block 16 is also included in the instrument, this erasing head being capable of being operated automatically in the well known manner to prevent double recordings or manually to achieve special effects.

Figure 5:
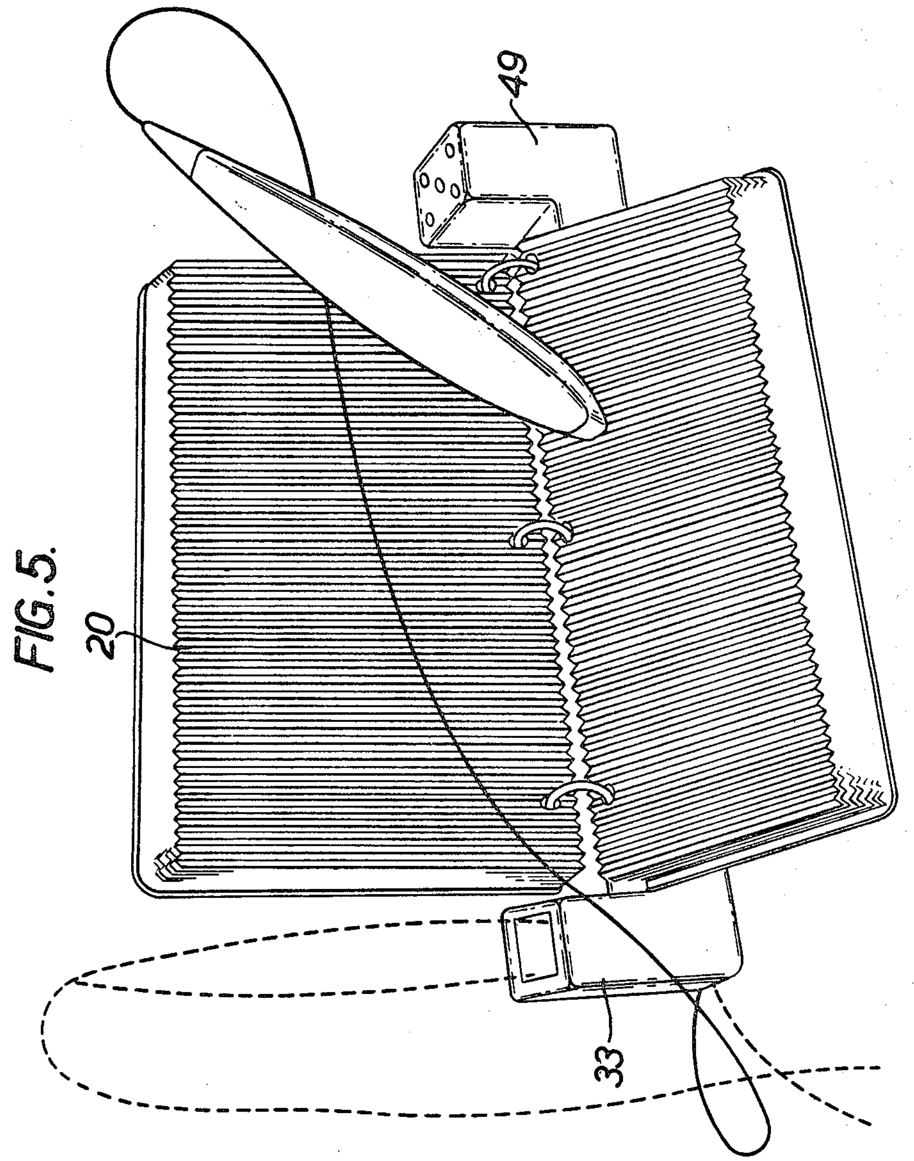
FIG. 5 is a perspective view of the apparatus of this invention showing the method of use.

The pre-recorded material is recorded on a strip of magnetic tape 17 which can be incorporated into pages of a book as shown in FIG. 5. For guiding the instrument along the tape 17, means such as corrugation 20 or the like, can be used.

As shown specifically in FIG. 3, the instrument can be conveniently fitted into a container 21 similar to that of a fountain pen. As is well known, pick-up and recording heads for magnetic tape require a source of power, and this source of power together with a micro switch or similar switch 19 can be conveniently placed in the container 21. The instrument can be resiliently mounted in the container 21 such that when the endless tape 1 is placed in contact with the magnetic strip 17, the switch 19 will be activated by movement of the instrument relative to the container.

Figure 6:
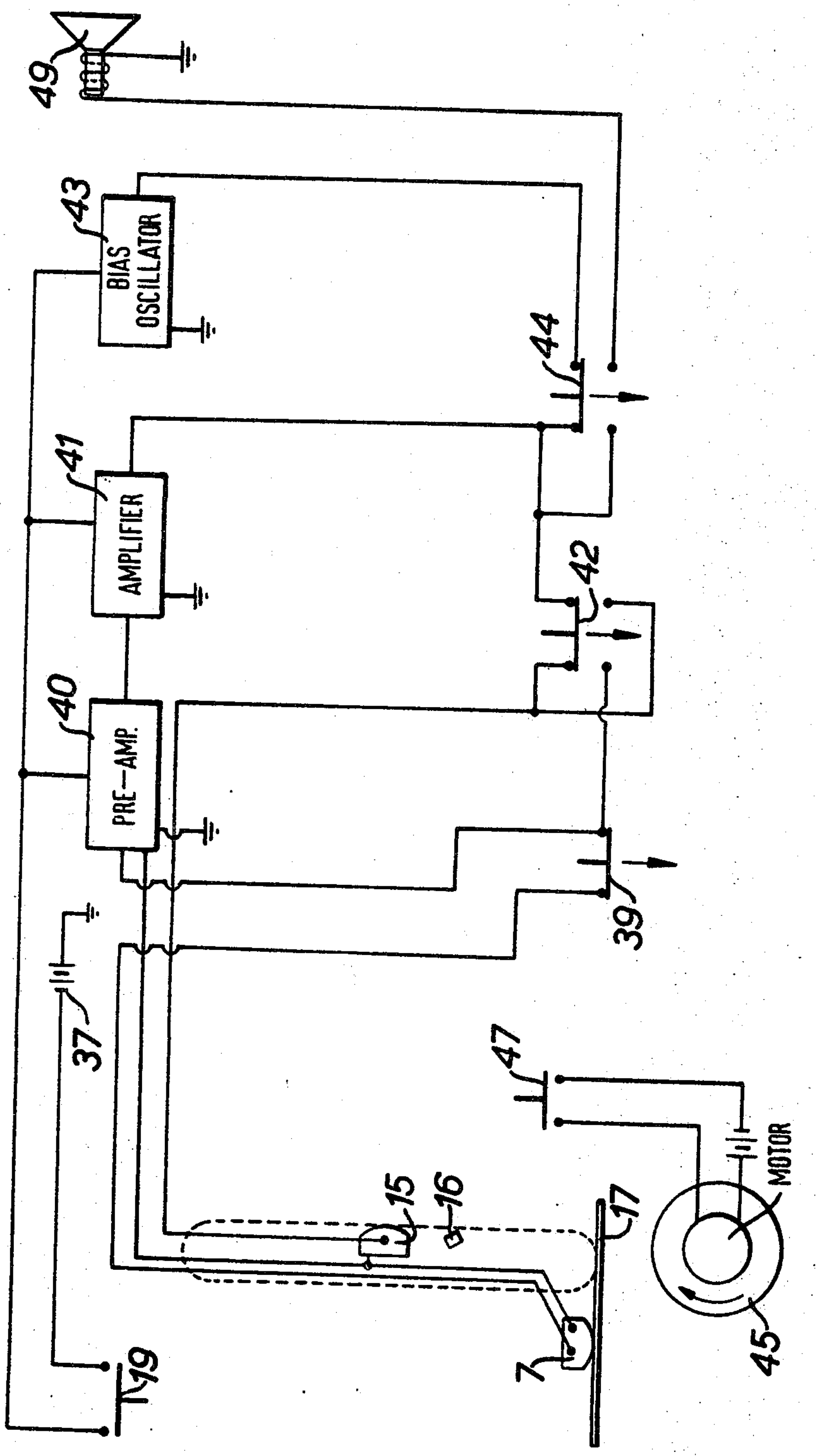
FIG. 6 is a wiring diagram of the apparatus of FIG. 1.

FIG. 6 is one type of circuit which can be used with the instrument of FIG. 1 and can more satisfactorily be described by reference to the operation of the instrument.

When the instrument is moved into the recording position against the magnetic tape 17, the switch 19 is closed by movement of the instrument inside the container 21. The circuitry is thus energized with the battery 37. Lateral movement of the instrument over the magnetic tape 17 induces a low energy signal of the information on the tape into the magnetic pick-up head 7. This low energy signal is carried through switch 39, a pre-amplifier 40 and an amplifier 41. The amplified signal is then fed to the recording and play back head 15 through the switch 42. Simultaneously, a 70 kilocycle signal produced by a bias oscillator 43 is fed through switch 44 to head 15 to provide the necessary recording bias.

Lateral motion of the instrument along the magnetic tape 17 moves the endless tape 1 past the head 15 so recording the information from the magnetic tape 17 onto the inner magnetic covering 2, the resulting recorded pattern being linearly proportional to that on the magnetic tape 17.

When the instrument is removed from the magnetic tape 17, the switch 19 reverts to its off position so deactivating the circuits in the instrument.

In order to play back the information stored on the endless tape 1, the instrument is placed in a unit 33 which includes a constant speed and drive mechanism (not shown) driving a wheel 45. When inserting the instrument into the unit 33, the switches 39, 42, 44 and 47, which are conveniently placed inside the unit 33 are activated so setting in motion the wheel 45, isolating the pick-up head 7 from the circuit and closing the play back circuits. Upon further pressure of the instrument into the unit 33, the endless tape 1 comes into contact with the wheel 45 and the switch 19 in the instrument container 21 is closed to energize the play back portion of the circuitry. The endless tape 1 then moves past the head 15 at the same constant rate which was used to record the original information on the magnetic tape 17. The low energy signal produced in the head 15 is fed through the switch 42 to the pre-amplifier 40, the amplifier 41, through the switch 44, and into a loudspeaker 49. The unit 33 and the loudspeaker 49 together with the preamplifier, amplifier and switches can conveniently be placed along the back of the book as shown in FIG. 5. The information from the endless tape 1 can be repeatedly reproduced as long as the instrument is held in contact with the wheel 45.

Removal of the instrument from the unit 33 deactivates all the circuits by returning the switches 19, 39, 42, 44 and 47 to the positions as shown in FIG. 6.

When it is desired to erase the information from the endless tape 1, an erasure magnet 16 can be manulally operated by a press-button (not shown) towards the endless tape 1 to remove the required information, or the erasure magnet 16 can be automatically activated to the erasing position in the recording mode of operation.

The embodiment of the instrument as shown in FIG. 2 utilizes an auxiliary driving band 23, a pulley 24 and a friction drum 26, to transmit the drive from the portion of the instrument moving along the magnetic tape 17 or the book, to an endless tape 25. This tape can be identical to that shown in FIG. 1. A pick-up head 27 is used for the same purpose as the pick-up head 7 in the embodiment of FIG. 1 and a recording and play back head 29 is similar to the recording and play back head 15 of the embodiment of FIG. 1. By using such an auxiliary band 23, more information per unit length can be recorded on the endless tape 25 than is pre-recorded on the magnetic tape 17. With such an arrangement, it is conceivable that the instrument can be made of a much shorter length than the instrument shown in FIG. 1, or conversely more information can be stored on the endless belt at one time than can be stored on the instrument of FIG. 1.

Obviously the drum 26 can be arranged so as to drive the endless tape 25 by its inside surface so necessitating reversing the endless tape 25 side for side and changing the position of the recording and play back head 29 to the outside of the endless tape 25.

FIG. 4 shows the arrangement for driving the instrument of FIG. 2 by using the unit 33 with the drive wheel 45.

It is also understandable that by the use of dual recording and play back heads, the associated circuitry and a suitably pre-recorded tape it will be possible to obtain stereophonic effects of the audio information.

I claim:

1. An instrument for retrieving information from a medium having a pre-recorded information pattern, said instrument comprising intermediate storage means, drive means for moving said intermediate storage means by contact thereof with said medium, recording means located in operative proximity to said intermediate storage means, pickup means located in operative proximity to said medium for movement past said medium during use of the instrument, said pickup means being arranged to pass information signals from said pre-recorded pattern to said recording means, relative adjacent movement between said instrument and said medium being operative to cause said pre-recorded information pattern to transmit signals from said pickup means to said recording means thereby to provide said intermediate storage means with stored information in the form of a recorded pattern which is linearly proportional to the pre-recorded pattern on said medium, and reproducing means for selectively driving said intermediate storage means at a pre-selected constant speed to retrieve said information from said intermediate storage means at the same rate at which the pre-recorded pattern was initially recorded on said medium.

2. The instrument of claim 1, wherein said medium has two longitudinally extending sections, one section comprising means for accepting said pre-recorded pattern and the other section presenting a surface for driving contact with said drive means.

3. The instrument of claim 1, wherein said pre-recorded pattern comprises an audio recording, said intermediate storage means comprising an endless loop of magnetic tape.

4. The instrument of claim 1, wherein said intermediate storage means comprises an endless loop of recording material trained between guides.

5. The instrument of claim 4, wherein said drive means comprises a friction surface on one side of said endless loop.

References Cited

UNITED STATES PATENTS

| | | | |
|---|---|---|---|
| 2,281,405 | 4/1942 | Barrish et al. ___ | 179—100.1 X |
| 2,822,425 | 2/1958 | Hicks ___ | 179—100.1 |
| 2,886,650 | 5/1959 | Fairbanks et al. ___ | 179—100.2 |
| 3,315,242 | 4/1967 | Haddad ___ | 179—100.2 X |
| 3,341,854 | 9/1967 | Supernowicz ___ | 179—100.2 X |

STANLEY M. URYNOWICZ, Jr., Primary Examiner

R. F. CARDILLO, Jr., Assistant Examiner